ced Patent [19]

Jones

[11] Patent Number: 4,580,476
[45] Date of Patent: Apr. 8, 1986

[54] METHOD AND APPARATUS FOR MAKING CHOCOLATE-COATED ICE CREAM COOKIE SANDWICHES

[76] Inventor: John F. Jones, 140 Summit Rd., Prospect, Conn. 06712

[21] Appl. No.: 604,858

[22] Filed: Apr. 27, 1984

[51] Int. Cl.⁴ .............................................. B26D 7/06
[52] U.S. Cl. ...................................... 83/160; 83/171; 83/256; 83/278; 83/444; 83/408
[58] Field of Search ................ 83/278, 279, 404, 256, 83/170, 171, 15, 42, 404.1, 404.2, 444, 639, 160, 408

[56] References Cited

U.S. PATENT DOCUMENTS

| | | | |
|---|---|---|---|
| 1,351,903 | 9/1920 | Hara | 83/278 |
| 1,395,655 | 11/1921 | Porz | 83/278 |
| 2,388,725 | 11/1945 | Criner | 83/444 |
| 2,660,962 | 12/1953 | Bloxham | 83/278 |
| 4,348,923 | 9/1982 | Huston | 83/42 |

Primary Examiner—James M. Meister
Assistant Examiner—John L. Knoble
Attorney, Agent, or Firm—Mattern, Ware, Stoltz & Fressola

[57] ABSTRACT

A low labor, highly efficient process and system for manufacturing chocolate coated ice cream cookie sandwiches is achieved by incorporating a conveyor system for transporting the ice cream cookie sandwich through the various stages of its manufacture along with uniquely constructed ice cream brick slicing machines and a unique chocolate coating machine. In addition, a pass-through freezer is preferably employed prior to the chocolate coating, in order to assure a high quality, tasty product. The ice cream slicing machine of the present invention employed in the process and manufacturing system of this invention is constructed for receiving a plurality of ice cream bricks and cutting each brick into a plurality of slices in an efficient, automatic, integrated operational procedure and presenting each ice cream slice to a holding zone for placement on a cookie moving along the conveyor system. In addition, the chocolate coating machine of the present invention incorporated into the process and manufacturing system of this invention incorporates a plurality of clamps controllably driven about the coating machine and positioned for receiving the ice cream cookie sandwich and automatically submerging the sandwich in a chocolate bath and automatically releasing the chocolate-coated ice cream cookie sandwich when the chocolate coating has completely cooled and dried.

16 Claims, 9 Drawing Figures

METHOD AND APPARATUS FOR MAKING CHOCOLATE-COATED ICE CREAM COOKIE SANDWICHES

TECHNICAL FIELD

This invention relates to a process and to machines for making ice cream cookie sandwiches and, more particularly, to the process and machines employed in making chocolate-coated ice cream cookie sandwiches.

BACKGROUND ART

Although ice cream sandwiches and ice cream cookie sandwiches have existed for many years and have been manufactured using a variety of alternate methods, no prior art system has been developed which is capable of employing ice cream bricks by cutting the bricks into a plurality of smaller slices, and then assembling the slices between two cookies in an efficient manner wherein labor costs are maintained at a minimum.

Furthermore, no prior art apparatus or process is capable of providing chocolate-coated ice cream cookie sandwiches, wherein the chocolate coating is achieved efficiently, with all used chocolate being recycled. In addition, prior art systems typically require a high degree of handling, thereby reducing production efficiency and causing increased production costs.

A further problem commonly found in prior art ice cream cookie sandwiches is the total inability of these prior art systems to prevent the cookies in the sandwich from having a high moisture content. Consequently, the cookie possesses a soft or soggy taste, resulting in undesirable consumer reactions.

Another problem commonly found in ice cream sandwich systems is a requirement that extruded ice cream be employed. This results in the need for expensive equipment as well as costly maintenance and lost time for malfunctions. In addition, the various flavors available for the consumer are extremely limited, thereby resulting in a product incapable of having a large variety of flavors to satisfy varying tastes.

Consequently, it is a principal object of the present invention to provide a method and apparatus for making chocolate-coated ice cream cookie sandwiches efficiently with a minimum of labor effort.

Another object of the present invention is to provide a method and apparatus for making chocolate-coated ice cream cookie sandwiches having the characteristic features described above, which is capable of employing ice cream bricks which are cut to desired smaller sections quickly and efficiently for placement on the cookie.

Another object of the present invention is to provide a method and apparatus for making chocolate-coated ice cream cookie sandwiches having the characteristics features described above wherein the resulting chocolate coated ice cream cookie sandwich possesses a fresh tasting, crisp and crunchy cookie which has no soft or soggy characteristics.

A further object of the present invention is to provide a method and apparatus for making chocolate-coated ice cream cookies sandwiches having the characteristic features described above, wherein the chocolate coating of the cookie sandwich is achieved in a virtually totally automated manner, which a minimum of labor, while also providing a completely chocolate-coated cookie sandwich without fear of partial coating.

Other and more specific objects will in part be obvious and will in part appear hereinafter.

SUMMARY OF THE INVENTION

The present invention eliminates the prior art difficulties and drawbacks by providing a method employing uniquely designed and constructed ice cream brick slicing machines and ice cream cookie sandwich chocolate coating machines. In addition, the entire process is achieved in a uniquely efficient manner with labor requirements being held to a minimum. This is achieved by employing highly automated ice cream brick slicing machines and highly automated chocolate coating machines which fully envelopes the ice cream cookie sandwich in a chocolate coating.

Another feature of the present invention is the incorporation of a pass-through freezer which assures the complete and rapid freezing of the ice cream cookie sandwich. In the teaching of the present invention, this pass-through freezer, preferably employing liquid nitrogen, is positioned in the overall conveyor system immediately after the formation of the ice cream cookie sandwich, prior to the chocolate coating of the ice cream cookie sandwich.

By incorporating the pass-through freezer immediately after the formation of the ice cream cookie sandwich, the cookies employed in the sandwich are incapable of absorbing moisture from the ice cream, as is typically found with prior art systems. Instead, the present invention immediately freezes the ice cream and the cookies prior to any degradation of the cookie by the moisture of the ice cream.

In addition, the present invention incorporates a uniquely constructed ice cream slicing machine which is capable of quickly and efficiently cutting bricks of ice cream into the desired sized slice for placement on the cookie. In this way, any desired ice cream flavor can be incorporated into the ice cream cookie sandwich.

In addition, the ice cream brick slicing machine of the present invention is capable of cutting the ice cream brick into the plurality of slices efficiently with low labor requirements. Furthermore, the system is capable of running continuously, for optimum ice cream cookie sandwich production. It has been found that the ice cream brick slicing machine of the present invention requires only routine maintenance and complete cleaning at the end of each day's run. As a result, the prior art difficulties typically encountered in machine breakage and down-time repair shutdowns are eliminated. Furthermore, the expensive equipment required for use of extruded ice cream is totally eliminated.

Another feature of the present invention is the incorporation of a uniquely constructed ice cream cookie sandwich coating machine which automatically dips the ice cream cookie sandwich into a vat of warm chocolate, and then allows the chocolate coating on the ice cream cookie sandwich to fully dry, by a pretimed travel system. In the preferred embodiment, a plurality of ice cream cookie sandwich holding jaws or clamps are employed with the clamps all interconnected by continuous chain drive belt. In this way, the desired continuous, pre-timed travel is achieved.

By employing the chocolate coating equipment of the present invention, the only labor requirement is in the removal of the frozen ice cookie sandwich from its conveyor system for securement between the clamping jaws of the chocolate coating machine. Once the ice cream cookie sandwich has been securely positioned in the clamping jaws, the entire remaining chocolate coating process is achieved automatically by use of a unique camming system, in combination with the continuous travel system wherein the chocolate-coated ice cream cookie sandwich is rotationally advanced about the machine for drying the chocolate coating. Then, each of the clamping jaws holding the chocolate-coated ice cream cookie sandwiches automatically opens, dropping the ice cream cookie sandwich onto a delivery conveyor system for delivering the chocolate-coated ice cream cookie sandwiches to the wrapping station for wrapping and packaging.

The invention accordingly comprises the several steps and the relation of one or more steps with respect to each of the others, and the apparatus embodying features of construction, combinations of elements and arrangements of parts which are adapted to effect such steps, all as exemplified in the following detailed disclosure, and the scope of the invention will be indicated in the claims.

THE DRAWINGS

For a fuller understanding of the nature and objects of the present invention, reference should be made to the following detailed description taken in connection with the accompanying drawings in which.

BEST MODE FOR CARRYING OUT THE INVENTION

Figure 1:
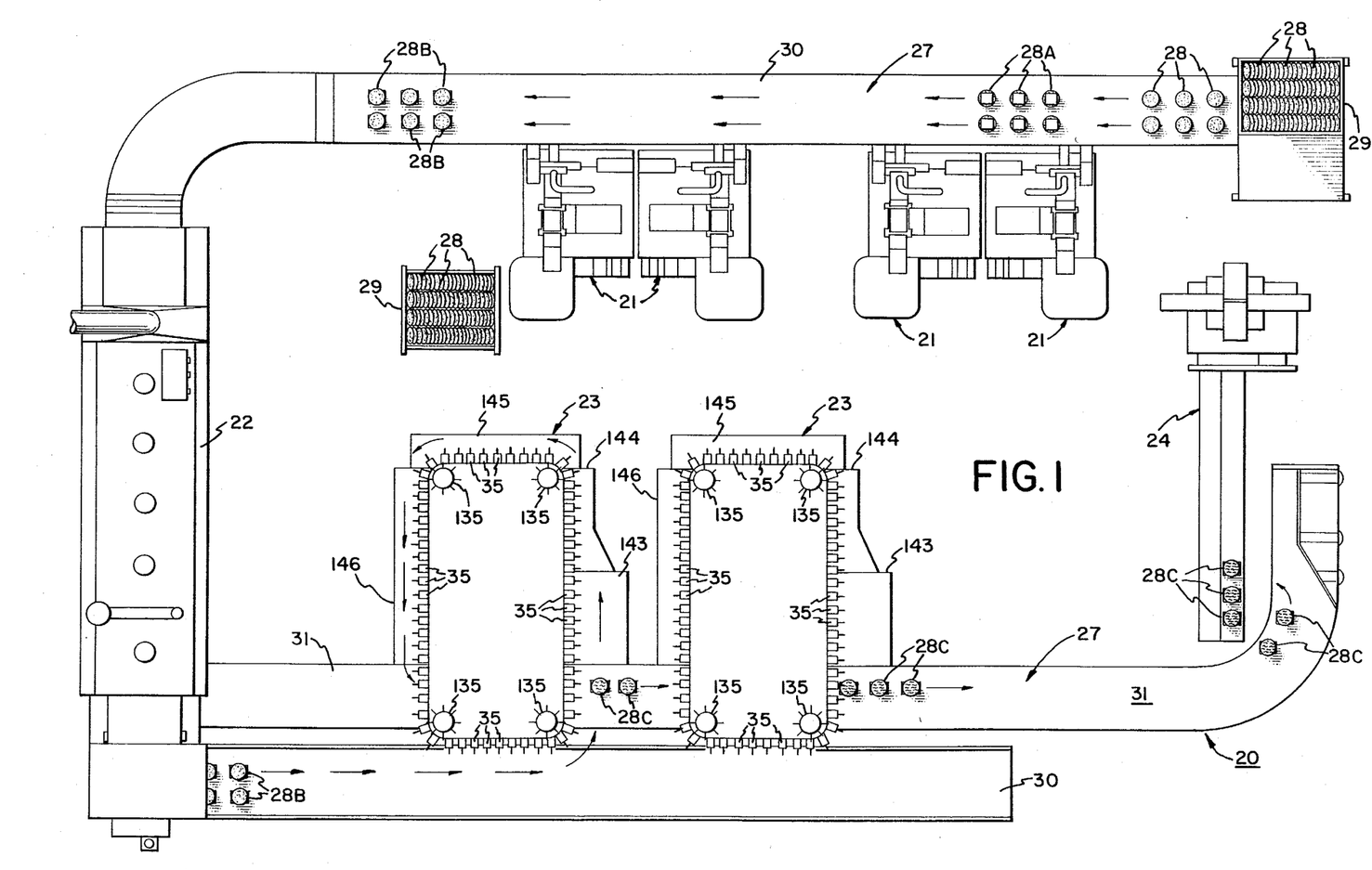
FIG. 1 is a top plan view of the apparatus employed in the method for making chocolate-coated ice cream cookie sandwiches embodying the present invention.

In FIG. 1, the chocolate-coated ice cream cookie sandwich manufacturing system 20 of the present invention is fully depicted. As shown therein, system 20 incorporates a plurality of ice cream brick slicing machines 21, a freezer unit 22, a plurality of chocolate coating machines 23, and an automatic chocolate-coated ice cream cookie sandwich wrapping machine 24. By employing these components, system 20 is capable of achieving a low labor, highly efficient, chocolate-coated ice cream cookie sandwich manufacturing system having optimum automation and a minimum of requisite labor. In addition, manufacturing system 20 is highly flexible, and is capable of meeting particular production requirements at any one time.

By referring to FIG. 1, along with the following detailed discussion, the overall operation of the chocolate-coated ice cream cookie sandwich manufacturing system of the present invention can best be understood. As mentioned above, all of the components employed in system 20 of this invention are operationally interconnected by an endless conveyor belt system 27. In operation, cookies 28 which are contained on a holding tray or cabinet 29 are placed at the beginning of conveyor system 27 by placing cookies 28 directly upon belt 30. As cookies 28 advance past ice cream brick slicing machines 21, the operator places one ice cream slice produced by slicing machine 21 on each cookie 28, thereby partially forming the desired ice cream cookie sandwich. For convenience, this partially formed ice cream cookie sandwich is designated in FIG. 1 as 28A.

Depending upon the production goals being sought, the number of ice cream brick slicing machines employed can be increased or reduced. In this way, the production requirements can easily be varied by matching the total number of ice cream brick slicing machines employed to the total output of chocolate-coated ice cream cookie sandwiches being sought.

Once partially formed ice cream cookie sandwiches 28A have advanced on conveyor belt 30 past the last ice cream brick slicing machine 21, an additional cookie 28 is placed upon the partially formed ice cream cookie sandwich, thereby completing the ice cream cookie sandwich. For convenience, this has been designated in FIG. 1 as ice cream sandwich 28B.

The next step in the manufacturing process of the present invention is to pass ice cream cookie sandwiches 28B through a pass-through freezer unit 22. In the preferred embodiment, freezer unit 22 comprises a nitrogen freezer which is capable of fast freezing ice cream cookie sandwiches 28B as the ice cream cookie sandwiches pass through freezer 22 on conveyor belt 30.

It has been found that by employing freezer unit 22 in a position which assures that ice cream cookie sandwiches 28B are passed through freezer unit 22 immediately after they are made, the moisture of the ice cream is not absorbed by cookie 28. In this way, the resulting product possesses a crisp, fresh tasting, crunchy cookie, while totally eliminating the soggy cookie typically produced using prior art methods.

Once ice cream cookie sandwiches 28B have passed through freezer unit 22, ice cream cookie sandwiches 28B are delivered on continuous conveyor belt 30 from the exit of freezer 22 to chocolate coating machines 23. By employing the teaching of this invention, complete, fully covered chocolate-coated ice cream cookie sandwiches are achieved with only a single operator being required. In the preferred operation, the operator stands in front of chocolate coating machine 23 and merely picks up the frozen ice cream cookie sandwich 28B and inserts the cookie sandwich into one of the holding clamps 35 mounted about ice cream coating machine 23.

As is fully detailed below, chocolate coating machine 23 incorporates a plurality of ice cream cookie sandwich holding clamps 35, all of which are interconnected by an endless chain drive belt which drives the clamps in a repeating cyclical manner about the entire chocolate coating machine 23, at a particular, pre-set speed. This speed is controllable by adjusting the speed of the drive motor or the gears.. During this movement, each ice cream cookie sandwich contained in clamp 35 is fully submerged into a warm chocolate vat, and then allowed to cool and dry as the ice cream cookie holding clamp 35 travels about chocolate coating machine 23. Once the chocolate coating about each ice cream cookie sandwich has fully cooled and dried, the chocolate-coated ice cream cookie sandwich holding clamp is automatically opened, above second conveyor belt 31, with the chocolate-coated ice cream cookie sandwich being dropped onto conveyor 31 for delivery to automatic wrapping machine 24. For purposes of convenience, the chocolate-coated ice cream cookie sandwich is designated in FIG. 1 as 28C.

As conveyor belt 31 of conveyor system 27 delivers the chocolate-coated ice cream cookie sandwiches 28C to automatic wrapping machine 24, the operating personnel merely moves the chocolate-coated ice cream cookie sandwich 28C from conveyor 31 to the wrapping machine 24, where the chocolate-coated ice cream cookie sandwich is automatically wrapped and exits from machine 24 for packaging and delivery.

Based upon the foregoing detailed discussion, it is readily apparent that the present system achieves the complete manufacture and wrapping of a chocolate-coated ice cream cookie sandwich with a system possessing inherent operational efficiencies and a minimum of labor. In addition, the system of the present invention attains a chocolate-coated ice cream cookie sandwich wherein the cookie avoids prior art difficulties and the entire chocolate-coated cookie sandwich is produced with a minimum of rejection rate and production difficulties.

ICE CREAM SLICING MACHINE

By referring to FIGS. 2 through 5, along with the following detailed disclosure, the overall construction and operation of ice cream brick slicing machine 21 of the present invention can best be understood. Slicer machine 21 comprises a support base 40 upon which is mounted an elongated, longitudinally extending ice cream delivery tunnel 41. Preferably, tunnel 41 comprises a substantially U-shape, with a removable overlying cover 46 enclosing tunnel 41. If desired, handle 46A is affixed to cover 46 to assist in removing cover 46 when required.

An air cylinder 42 is securely mounted to the floor portion of tunnel 41 at one end thereof, by brackets 56. Piston rod 43 extends from cylinder 42 and is drivingly connected to an ice cream section advancing block 44. As is more fully detailed below, air cylinder 42 is constructed for reciprocally driving piston rod 43 and ice cream section advancing block 44. In this way, block 44 is longitudinally reciprocatingly driven through tunnel 41 in response to the pneumatic input to cylinder 42.

Figure 4:
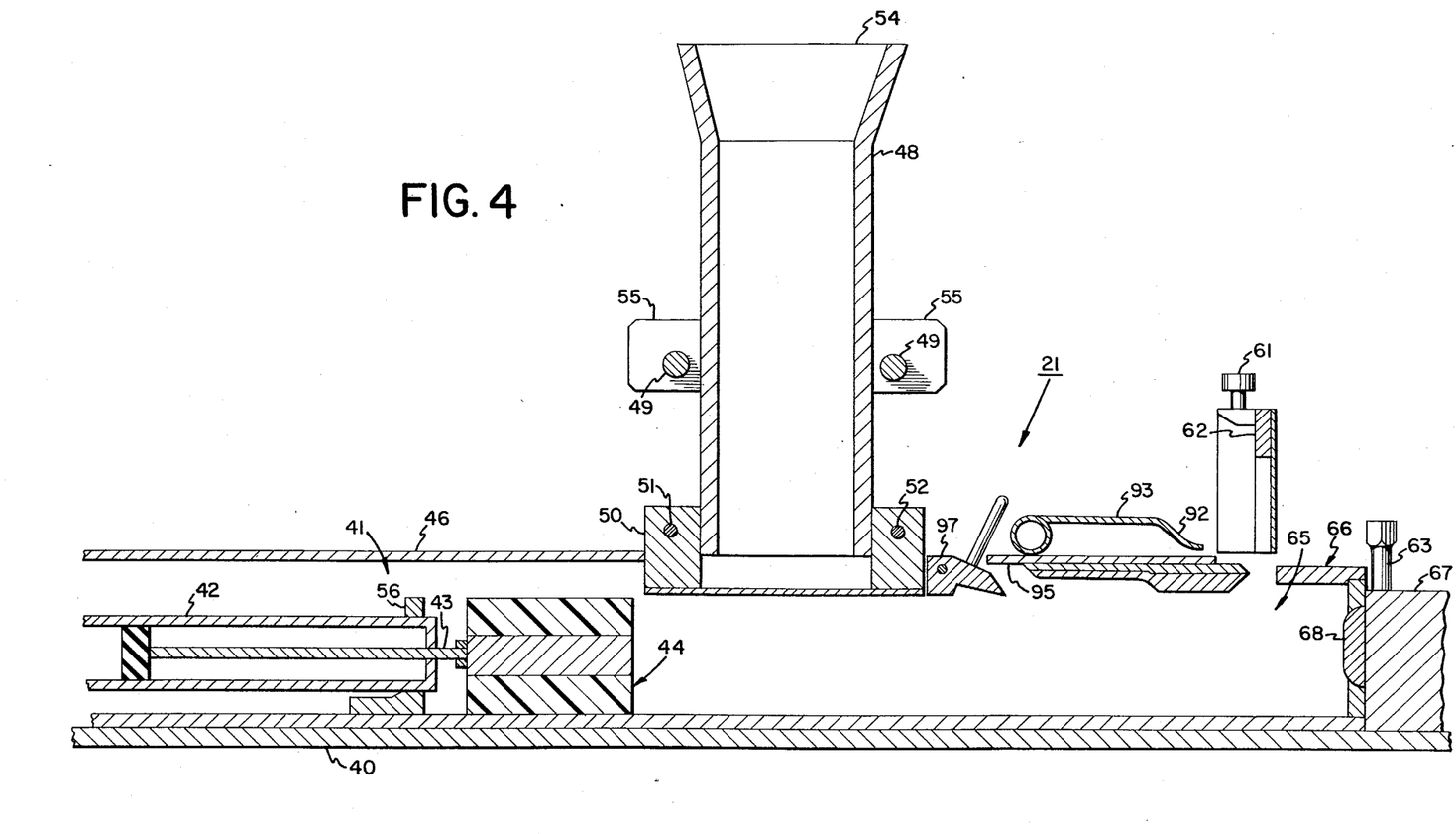
FIG. 4 is a cross-sectional front elevational view, partially broken away, of the ice cream brick slicing machine of the present invention, taken along line 4—4 of FIG. 3.

As shown in FIG. 4, block 44 preferably comprises three independent layers. The control layer comprises aluminum, and the top and bottom layers comprise teflon. In this way, trouble-free slidability is assured. In addition, the teflon layers are preferably screwed and glued to the aluminum layer, thereby preventing bacteria or trapping buildup between the layers.

Figure 2:
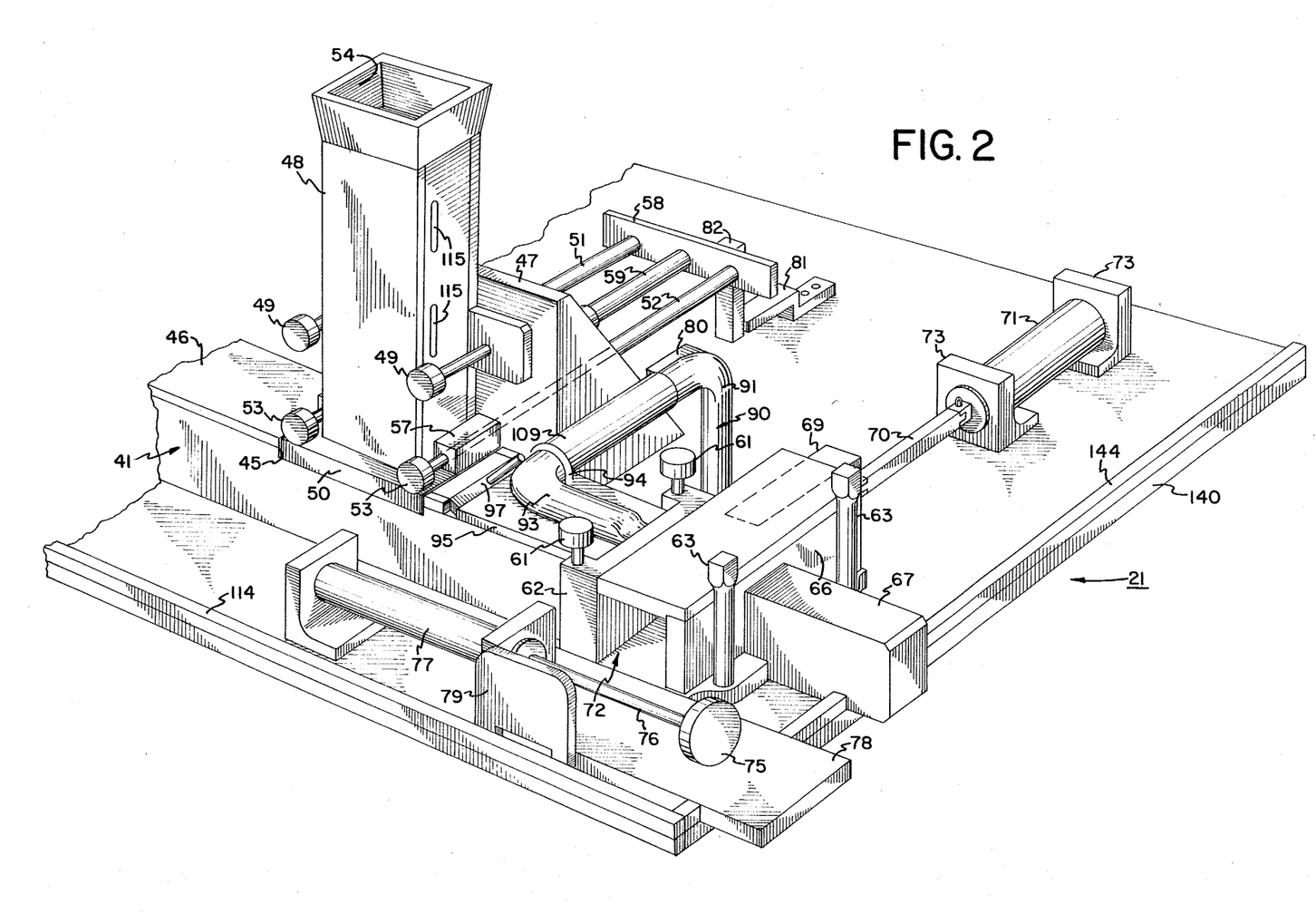
FIG. 2 is a perspective view, partially broken away, showing the ice cream brick slicing machine of the present invention.
Figure 3:
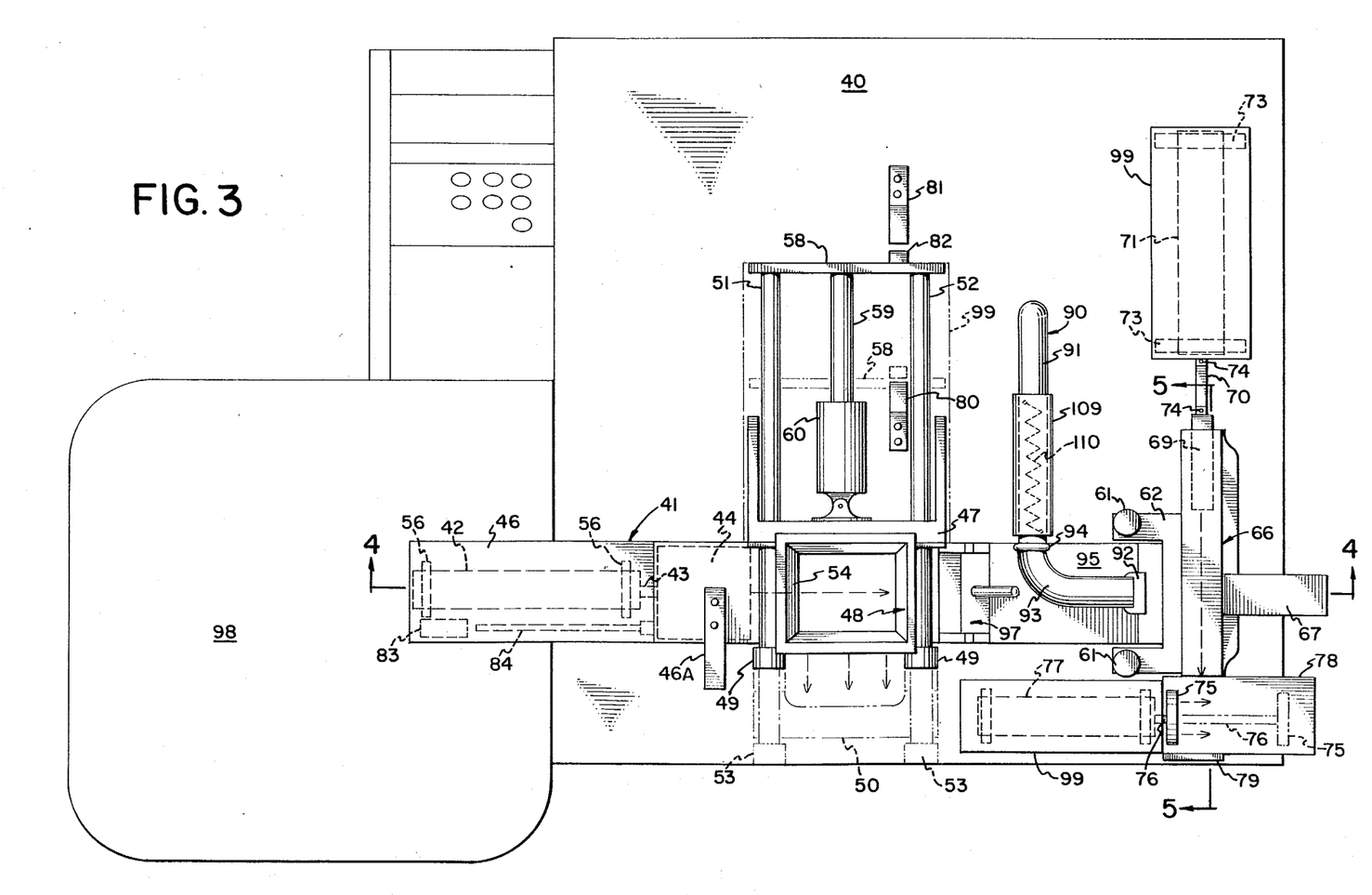
FIG. 3 is a top plan view of the ice cream brick slicing machine of the present invention.

Ice cream slicing machine 21 also incorporates a support wall 47, which is securely mounted to base 40. On one side of support wall 47, an ice cream brick receiving and delivering chute 48 is removably mounted by means of screw knobs 49-49. In this way, chute 48 can be quickly and easily removed for cleaning. Chute 48 incorporates an ice cream brick receiving portal 54 and an ice cream brick exit portal positioned in juxtaposed cooperation with ice cream brick receiving portal 45 of tunnel 41.

In addition, an ice cream brick slicing blade 50 is movably mounted between the exit portal of ice cream brick chute 48 and ice cream brick receiving portal 45 of tunnel 41. Ice cream brick slicing blade 50 is constructed for substantially horizontal reciprocal movement into and out of mating engagement between chute 48 and tunnel 41. In this way, the ice cream brick contained in chute 48 is sliced into the desired sections, prior to movement of the section through tunnel 41.

As previously mentioned, ice cream brick receiving chute 48 is removably mounted to support wall 47 by flanges 55 of chute 48 and elongated screw knobs 49-49. In this way, chute 48 is quickly and easily mounted in position for use and, when its use is completed, quickly and easily removed for washing. Similarly, ice cream brick slicing blade 50 is removably mounted to elongated shafts 51 and 52 by threaded knobs 53-53. By threadedly disengaging knobs 53-53 from the terminating screw-thread ends of elongated shafts 51 and 52, slicing blade 50 is easily removed from ice cream brick slicing machine 21 for washing.

Elongated blade supporting shafts 51 and 52 are slidingly mounted in support wall 47 for axial movement therethrough. Preferably, shafts 51 and 52 are slidably supported in support wall 47 by bushings 57. In the preferred embodiment, bushings 57 comprise sealed liquid bushings to assure both cleanliness and trouble-free slidability of shafts 51 and 52 through support wall 47.

In the preferred embodiment, the distal end of shafts 51 and 52 are securely mounted to a bracket 58, along with the distal end of piston rod 59. As best seen in FIG. 3, the proximal end of piston rod 59 is mounted in air cylinder 60 with air cylinder 60 securely mounted to support wall 47. In this way, stability and trouble-free, operational repeatability is provided.

In operation, air cylinder 60 controls the slicing movement of ice cream brick slicing blade 50. When the proper pneumatic pressure is applied to cylinder 60, piston rod 59 is drawn into cylinder 60, causing bracket 58 to advance towards cylinder 60, while simultaneously longitudinally forcing elongated support shafts 51 and 52 from a first fully extended position, to a second, partially extended position wherein bracket 58 has been drawn close to cylinder 60. As shown in FIG. 3, when shafts 51 and 52 and bracket 58 are in the first, fully extended position, slicing blade 50 is in its fully inserted position, nested between chute 58 and tunnel 41. However, when cylinder 60 has drawn bracket 58 forwardly, toward cylinder 60, with shafts 51 and 52 advancing axially therewith, to the position shown in phantom in FIG. 3, slicing blade 50 is moved by the proximal ends of shafts 51 and 52 to the position shown in phantom in FIG. 3. In this position, blade 50 is adjacent to tunnel 41, out of ice cream receiving portal 45 of tunnel 41.

In addition to the horizontally disposed ice cream slicing blade 50, ice cream slicing machine 21 of the present invention also incorporates a vertically disposed ice cream slicing blade 62. Ice cream slicing blade 62 is mounted for easy removability by employing knob members 61-61. In this way, slicing blade 62 can be easily removed after use for cleaning. Slicing blade 62 is reciprocatingly driven through a substantially vertical plane in a manner similar to the reciprocating drive system of blade 50. By referring to FIG. 5, the detailed construction of the drive system for reciprocatingly driving blade 62 can best be understood.

Figure 5:
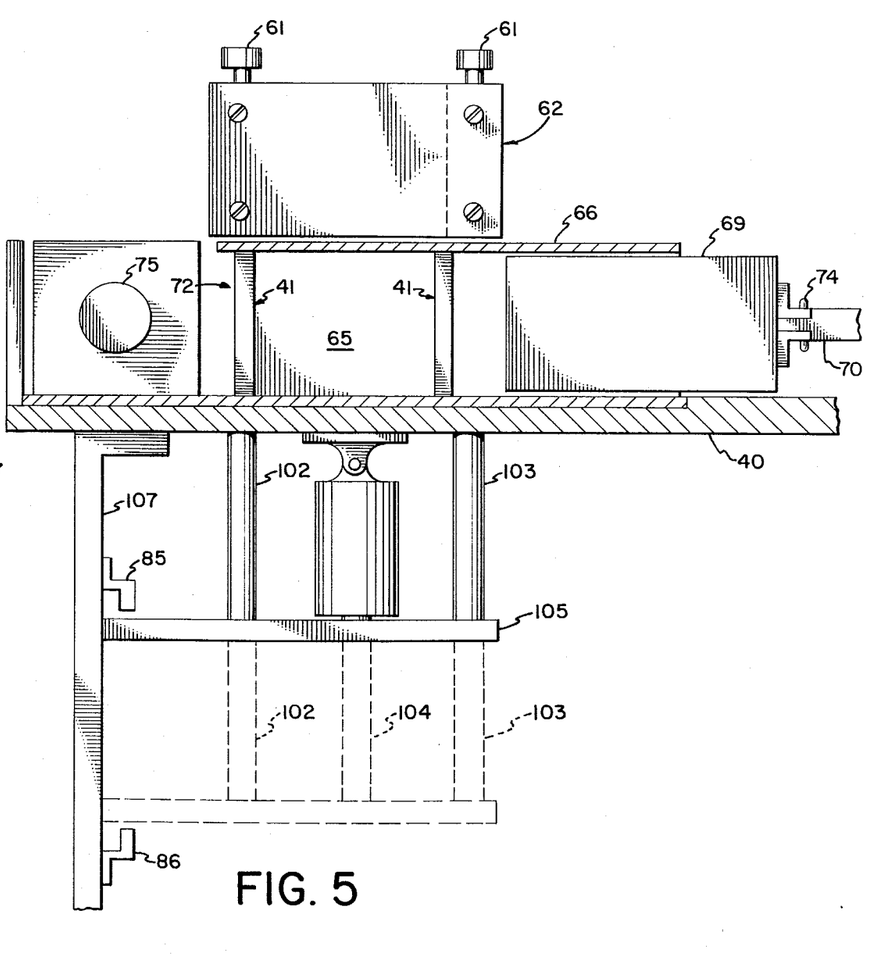
FIG. 5 is a cross-sectional side elevational view of the ice cream slicing machine of the present invention taken along line 5—5 of FIG. 3.

Slicing blade 62 is constructed for moving vertically into and out of slicing engagement between tunnel 66 and tunnel 41. In order to obtain the desired vertical slicing operation, blade 62 is secured to elongated shafts 102 and 103 at one end thereof by screw knobs 61. The opposed ends of shafts 102 and 103 are affixed to bracket 105. In addition, cylinder 101 is mounted to base 40, extending vertically therefrom, and incorporates a piston rod 104, the distal end of which is secured to bracket 105.

When in its fully drawn position, piston rod 104 is drawn into cylinder 101, bringing bracket 105 in close, juxtaposed, spaced, relationship to cylinder 101. In this position, slicing blade 62 is in its fully raised position, above tunnel 41 and tunnel 66, out of engagement therewith.

When activated, cylinder 101 causes piston rod 104 to extend out of cylinder 101, thereby causing bracket 105 to move to its fully extended position. This causes elongated shafts 102 and 103 which are secured to bracket 105 to move therewith, to their fully extended position.

Since blade 62 is mounted to the opposed ends of shafts 102 and 103, the movement of bracket 105 and shafts 102 and 103 causes blade 62 to vertically descend, into engagement between tunnel 66 and tunnel 41. As is fully detailed below, this vertical movement causes any ice cream contained in tunnel 41 and extending into tunnel 66 to be sliced.

In the preferred embodiment, proximity sensors 85 and 86 are mounted to a support bracket 107 which is secured to base 40. Sensor 85 is positioned along bracket 107 in position to sense bracket 105 when bracket 105 is in its upward, fully withdrawn position, with blade 62 out of engagement with tunnel 41 and tunnel 66. Sensor 86 is also securely mounted to bracket 107 in position to sense the fully extended position of bracket 105, when blade 62 is in its downward, tunnel engaged position.

As best seen in FIGS. 2 and 4, ice cream section receiving and advancing tunnel 41 comprises an exit portal 65 in which ice cream slicing blade 62 is reciprocatingly mounted. In addition, exit portal 65 of tunnel 41 is in mating communication with ice cream slice receiving and delivering tunnel 66.

Ice cream slice receiving and delivering tunnel 66 comprises a substantially C-shape, with the floor portion thereof removably securable to base 40 by screw means 63. In this way, the entire tunnel assembly 66 is easily removed for cleaning.

Tunnel 66 also incorporates a sensor 67 in which is mounted an ice cream slice sensor button 68. In addition, ice cream slice receiving and delivering tunnel 66 incorporates a reciprocatingly mounted ice cream pushing block 69 which is preferably formed of teflon and is drivingly connected to piston bar 70 of air cylinder 71. Finally, tunnel 66 incorporates an exit portal 72 through which an ice cream slice is pushed by block 69 in response to activation of cylinder 71. In the preferred embodiment, cylinder 71 is mounted to base 40 by brackets 73. In addition, piston bar 70 is mounted at its opposed ends to cylinder 71 and block 69 by removable pins 74. In this way, the entire assembly is quickly and easily disassembled for cleaning.

The overall construction of ice cream slicing machine 21 is completed by incorporating a reciprocatingly mounted ice cream slice delivering disc 75. Disc 75 is securely mounted to piston rod 76 of air cylinder 77. In this way, when an ice cream slice is advanced through portal 72 of tunnel 66, cylinder 77 is activated, causing piston rod 76 to advance axially out of cylinder 77, causing disc 75 to contact the ice cream slice and deliver the ice cream slice to the desired platform area 78. In this position, the slice of ice cream is ready for removal from platform 78 for placement on cookie 28 on conveyor 30.

In the preferred construction, platform 78 incorporates an upstanding flange 79 mounted thereto, which is aligned with exit portal 72 of tunnel 66. Flange 79 forms a positive stop for the ice cream slice as the slice is pushed out of tunnel 66.

In operation, ice cream slicing machine 21 is capable of quickly and efficiently slicing a brick of ice cream into a plurality of ice cream slices, and delivering each ice cream slice to platform 78 for placement on cookie 28. Although ice cream slicing machine 21 can be timed in a variety of ways to achieve any desired slicing sequence or ice cream slice size, the following has been found to be the preferred operational sequence, and timing arrangement.

In the preferred operation, an ice cream brick of any desired flavor is inserted into ice cream brick receiving portal 54 of chute 48 and advanced through chute 48 to the exit portal of chute 48. Preferably, this is best achieved by placing a plurality of bricks in chute 48 and continuously feeding additional ice cream bricks.

Once the ice cream bricks are mounted in chute 48, ice cream machine 21 is ready for efficient, continuous operation. In this preferred operation, cylinder 60 is activated in order to draw piston rod 59 and support bracket 58 towards cylinder 60, thereby simultaneously causing shafts 51 and 52 to move longitudinally towards support wall 47, causing ice cream cutting blade 50 to move out of nested engagement with chute 48 and tunnel 41. This position is shown in phantom in FIG. 3.

Once blade 50 has been moved to its tunnel disengaged position, the ice cream bricks within chute 48 are capable of moving vertically downward, until the ice cream column has reached the base of tunnel 41. Typically, gravity causes the plurality of stacked ice cream bricks to move vertically downwardly as soon as blade 50 is moved to its tunnel disengaged position. Next, cylinder 60 is activated to cause piston rod 59 to move outwardly of cylinder 60, driving bracket 58 toward the rear of ice cream slicing machine 21. This simultaneously drives shafts 51 and 52 therewith, forcing ice cream cutting blade 50 from its disengaged position, back to its tunnel and chute engaged position. As blade 50 moves from its disengaged position to its engaged position, blade 50 slices off a section from the ice cream brick contained within tunnel 41.

In order to control and properly time the movement of blade 50, as well as the cooperating movement of all of the components of slicing machine 21, a unique sensor system is employed. As shown in FIG. 3, the blade disengaged position as well as the blade slicing and engaged position are sensed by employing a forward travel sensor 80 and rearward travel sensor 81, both of which are securely mounted to base 40 of ice cream slicing machine 21. In addition, support bracket 58 incorporates a bar 82 mounted on either the front or rear surfaces of bracket 58, in order to contact fixed sensors 80 and 81.

In the preferred embodiment, all of the sensors employed in the present invention comprise proximity sensors or low voltage, solid state electronic switches. In this way, the presence or absence of a particular signalling device is recognized by the sensor.

Once cylinder 60 has driven slicing blade 50 to its fully engaged position, sensor 81 is activated, which causes air cylinder 42 to be activated, while also causing cylinder 60 to be re-activated to remove blade 50 from chute 48, drawing bracket 58 towards cylinder 60 and causing sensor 80 to be activated. The activation of cylinder 42 causes piston rod 43 to advance out of cylinder 42, causing block 44 to advance longitudinally through tunnel 41, pushing the ice cream section that had just been sliced towards vertical slicing blade 60.

Although the length of travel of piston rod 43 and block 44 through tunnel 41 can be varied without departing from the scope of the present invention, it has been found that in the preferred embodiment, block 44 is moved through tunnel 41 a distance substantially equal to the length of one ice cream section. Consequently, before any ice cream reaches blade 60, tunnel 41 must be filled with about three ice cream sections.

This automatic cycling is attained by constructing cylinder 42 to automatically recycle to its original, fully withdrawn position each time piston rod 43 is fully extended and no signal is received from sensor 67 after a pre-set time delay. In the preferred embodiment, the time delay is set at about three seconds.

In addition, a sensor 83 is mounted in tunnel 41, preferably near the rear of cylinder 42, and cooperates with an elongated signal generating rod 84 mounted to block 44. Rod 84 is constructed to activate sensor 83 each time block 44 is in its fully withdrawn position. In addition, the activation of sensor 83 causes cylinder 60 to be activated to extend bracket 58 away from cylinder 60, thereby moving cutting blade 50 into chute 48 and tunnel 41 for cutting another ice cream section.

In this way, tunnel 41 is easily filled with ice cream sections, since cylinder 42 causes block 44 to push each ice cream section out of the vertical zone defined by chute 48 and then automatically return block 44 to its original position. Then, with block 44 clear of chute 48, cylinder 60 is activated, causing blade 50 to advance into tunnel 41, cut off another ice cream section, and then withdraw from chute 48 as cylinder 60 is recycled to its starting position.

Once tunnel 41 has been filled with ice cream sections from chute 48 to cutting blade 60, the second cutting process incorporated into the ice cream slicing machine of the present invention is achieved. In this operation, cylinder 42 is activated, as described above, causing block 44 to begin its ice cream pushing advance through tunnel 41. As block 44 advances through tunnel 41, the ice cream sections are pushed through exit portal 65 of tunnel 41 into tunnel 66, until button 68 is pushed, causing sensor 67 to be activated. The activation of sensor 67 causes cylinder 42 to stop advancing. This is preferably achieved by venting the air pressure in cylinder 42 in addition to stopping the air being supplied.

In addition, cylinder 101 is activated to move to its fully extended position, thereby causing blade 62 to move vertically from its fully extended position with blade 62 out of engagement with tunnel 41, to its fully inserted position in tunnel 41. This movement causes a slice of ice cream to be cut from the section.

When blade 62 is in its down, ice cream cutting position, sensor 86 is activated. This causes cylinder 71 to be activated, which initiates the movement of ice cream slice pushing block 69 through tunnel 66. Simultaneously, sensor 86 also causes cylinder 101 to be activated, thereby drawing bracket 105 upwardly, which causes blade 62 to be moved upwardly to its raised position, extending outwardly of tunnel 41 and tunnel 66. When blade 62 is in its raised, tunnel-disengaged position, sensor 85 is activated, which causes cylinder 42 to be activated again, in order to push more ice cream through tunnel 41 into tunnel 66. As described above, cylinder 41 continues to push ice cream through tunnel 41 into tunnel 66 until sensor 67 is activated again. Then, the controlled movement of blade 62 as detailed above occurs again.

In addition to activating cylinder 71 to cause block 69 to be advanced through tunnel 66, cylinder 77 is also activated to bring disc 75 in its fully withdrawn position, thereby assuring that the ice cream slice pushed out of tunnel 66 by block 69 advances to flange 79, unimpeded by piston rod 76, and in the desired position for being moved forwardly by disc 75.

In this way, each time blade 62 is moved into its tunnel disengaged position, with blade 62 positioned above tunnel 41, cylinder 42 is activated to move the ice cream sections through tunnel 41, causing the ice cream to extend out of portal 65 of tunnel 41 into tunnel 66. Then, blade 62 is moved vertically downward, causing the ice cream slice positioned in tunnel 66 to be cut from the ice cream section.

As discussed above, sensor 86 activates cylinder 71 to move bar 70 forwardly. As a result, pusher block 69 which is securely mounted to the end of bar 70 is advanced through tunnel 66, causing the slice of ice cream contained within tunnel 66 to be moved outwardly to upstanding flange 79.

The forwardmost travel of rod 70 and pusher 69 is sensed by a block-extended sensor in cylinder 71. When the block-extended sensor in cylinder 71 is activated, cylinder 71 is automatically cycled to return to its original block-withdrawn position. Simultaneously therewith, cylinder 77 to advance rod 76 forwardly along with ice cream slice pusher disc 75, which contacts one side of the ice cream slice and pushes the ice cream slice forward to platform 78 for removal by the operator.

When cylinder 71 is returned to its original position, with pusher 69 at the rear of tunnel 66, ready for receipt of another ice cream slice, a block-withdrawn sensor, which is built in cylinder 71 is activated. Preferably, this sensor is used to simultaneously recycle cylinder 71 to advance block 69 outwardly while also activating cylinder 77 to withdraw rod 76 into cylinder 77. In this way, the smooth, continuous, trouble free operation of the ice cream slicing machine 21 of this invention is attained.

In order to further enhance an obtain continuous, trouble-free operation, ice cream slicing machine 21 of this invention preferably incorporates a cutting blade heater system 90. Heater system 90 incorporates a heater 110 built into pipe 90 and a blower (not shown). Preferably, the blower is mounted below supporting base 40 of slicing machine 21 with pipes 91 extending from the blower through base 40 upwardly to slicing blade 62. In addition, a heat spreading nozzle 92 is preferably mounted on the terminating end of pipe 91 in order to optimize the heat being delivered to cutting blade 62. Also, a heater shield 109 is mounted about pipe 91 in the area in which the heater 110 is mounted, in order to protect the operators.

In the preferred embodiment, heat spreading nozzle 92 is connected to main heat delivering pipe 91 by an intermediate pipe section 93 and a quick disconnect coupling 94. In addition, in the preferred embodiment, nozzle 92, pipe section 93, and coupling 94 are all securely mounted to cover plate 95, which forms the top surface of the distal section of tunnel 41. By employing this construction, heated air is capable of being directly blown onto cutting blade 62, thereby preventing icing or freezing of the cutting blade during its continuous cutting operation, while also allowing cover 95 of tunnel 41 to be quickly and easily removed for cleaning of the inside, ice cream delivery tunnel. Preferably, coupling 94 incorporates a spring loaded cover, thereby preventing water from reaching the heater.

A further enhancement appearing in the preferred construction of ice cream slicing machine 21 is the incorporation of an ice cream movement controlled pawl 97 mounted between cover 95 and ice cream receiving chute 48. In operation, pawl 97 allows the ice cream sections to freely move towards cutting blade 60, while preventing the ice cream from being moved in the opposite direction. In this way, the continuous ice cream advance to cutting blade 60 is further enhanced and assured.

An additional feature preferably incorporated into the ice cream slicing machine 21 of the present invention is a table section 98 mounted adjacent to supporting platform 40. Table section 98 is preferably employed as a holding zone for the ice cream bricks being fed into ice cream receiving chute 48. In this way, the continuous ice cream slicing operation of this invention can be achieved efficiently in the desired, continuous uninterrupted manner attainable by the present invention.

Another feature incorporated into ice cream slicing machine 21 of this invention are cylinder covers 99 which are mounted over cylinders 71, 77, as well as cylinders 60 and its associated tracks 51 and 52. In this way, the air cylinders are contained within a covered housing, thereby adding both to the aesthetics as well as to the cleanliness of the entire ice cream slicing operation. Preferably, covers 99 are formed from sheet metal material and are positioned for quick removability in order to have easy access each cylinder if any operational problems are encountered.

Although the foregoing discussion has referred to slicing machine 21 as a slicing machine for rectangular-shaped ice cream bricks, slicing machine 21 can be employed for ice cream bricks, logs, rolls or cylinders of any size, shape or length. In addition, slicing machine 21 can be employed for slicing products other than ice cream.

Another feature incorporated into slicing machine 21 is elongated upstanding edge bars 114 mounted to table 40 along the side edges thereof. Edge bars 114 serve as cams, preventing any melting ice cream from dripping onto the floor.

A further feature preferably employed is a plurality of viewing slots 115 formed in chute 48. In this way, the level of the ice cream in chute 48 is easily seen and known.

Chocolate Coating Machine

In FIGS. 1 and 6 through 9, various views of the chocolate coating machine 23 and its component parts are shown. By referring to these figures, along with the following detailed disclosure, the construction and operation of the unique chocolate coating machine of the present invention can best be understood.

Figure 7:
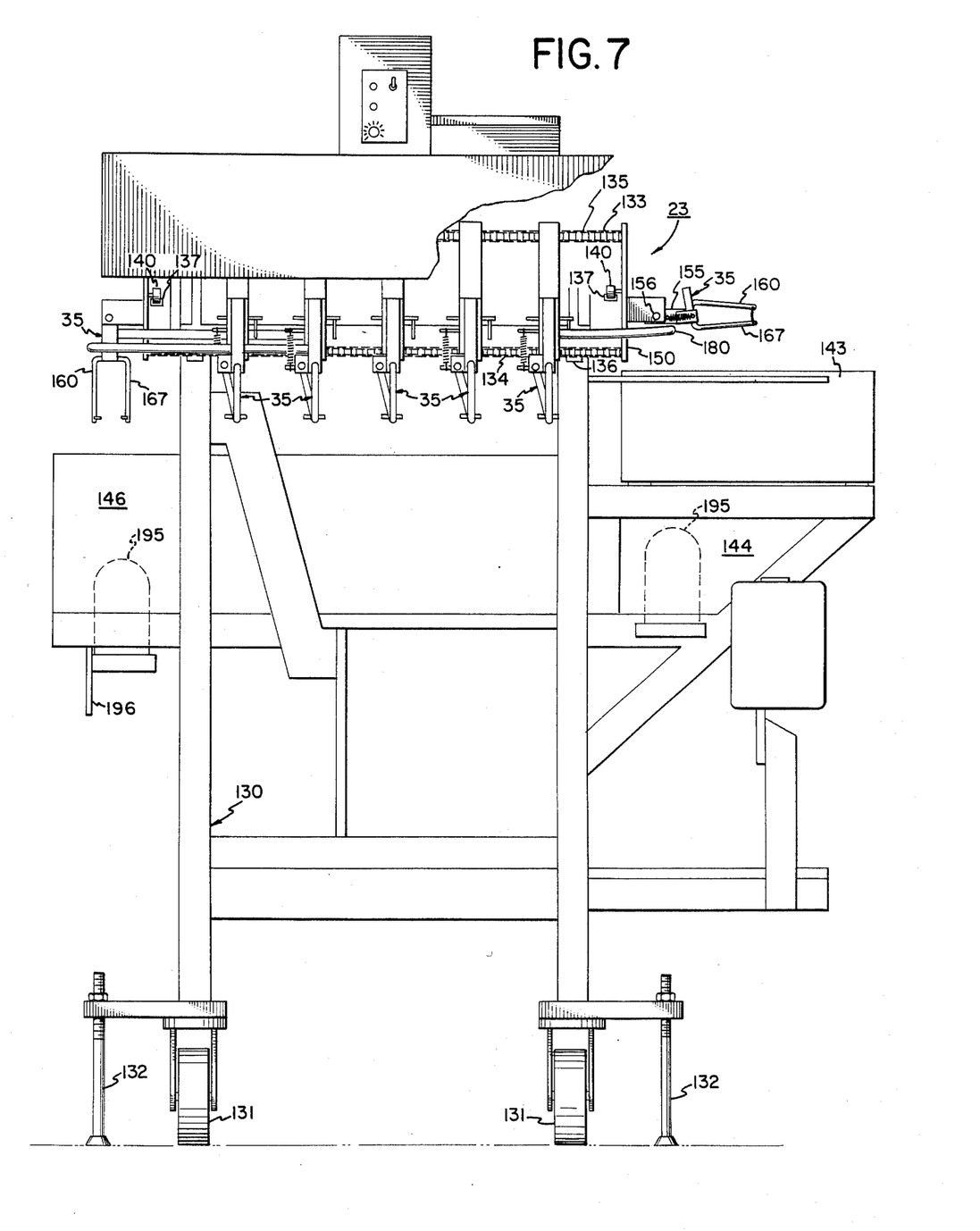
FIG. 7 is a front elevational view of the ice chocolate coating machines of the present invention.

As shown in FIG. 7, chocolate coating machine 23 comprises a supporting frame assembly 130 comprising a plurality of steel columns and plates, all of which are welded together to support the various components forming chocolate coating machine 23. Preferably, chocolate coating machine 23 with its frame assembly 130 is mounted on wheels 131 in order to facilitate the positioning of chocolate coating machine 23 in a desired location. Then, once chocolate coating machine 23 has been installed in its desired position, anchor members 132 are driven into the floor, in order to secure chocolate coating machine 23 in position.

Chocolate coating machine 23 incorporates a plurality of ice cream cookie sandwich holding clamps 35, all of which are in spaced relationship to each other peripherally surrounding chocolate coating machine 23. Preferably, holding clamps 35 are secured to an upper endless chain drive belt 133 and a lower endless chain drive belt 134. In addition, upper chain drive belt 133 is drivingly engaged with upper sprocket wheels 135 in each of the four corners of machine 23, and lower chain drive belt 134 is drivingly engaged with lower sprocket wheels 136 in each of the four corners of chocolate coating machine 23. The rotation of drive wheels 135 and 136 are controlled by a motor driven chain drive system, which is drivingly interconnected with at least one of the shafts on which at least one pair of drive wheels 135 and 136 are mounted. Since this system is conventional, it is not shown.

By securely mounting the plurality of holding clamps 35 to endless chain drive belts 133 and 134, clamps 35 are rotationally driven about the entire periphery of chocolate coating machine 23, at a controlled, constant rate of speed, depending upon the speed of the drive motor and the intermediate gears. As a result, the travel time of each holding clamp 35 from the beginning of its rotational cycle to the end, is completely controlled by the equipment and, once established, remains constant.

Figure 8:
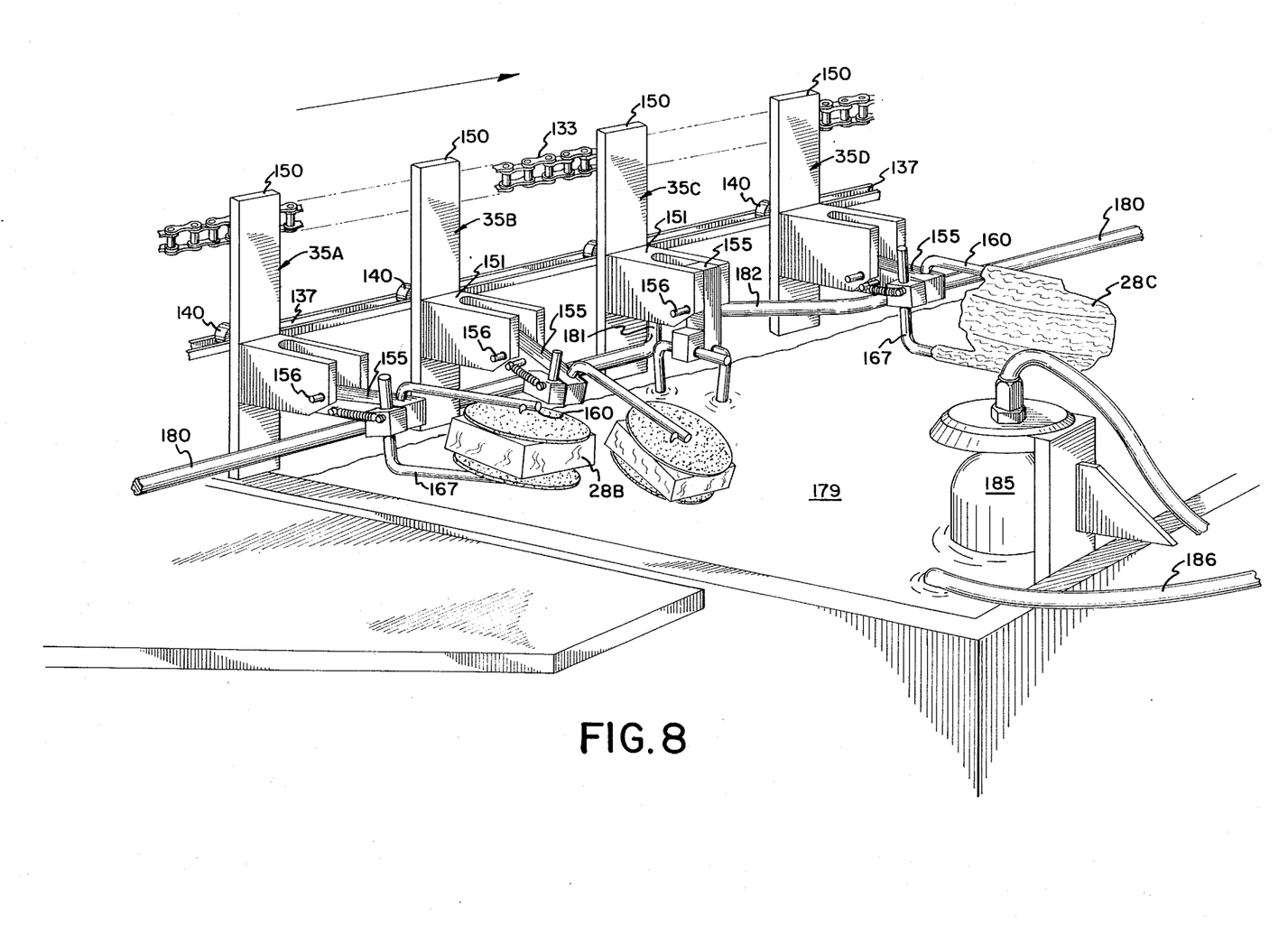
FIG. 8 is a perspective view of the chocolate coating machines of the present invention showing the ice cream cookie sandwiches during the chocolate dipping process.
Figure 9:
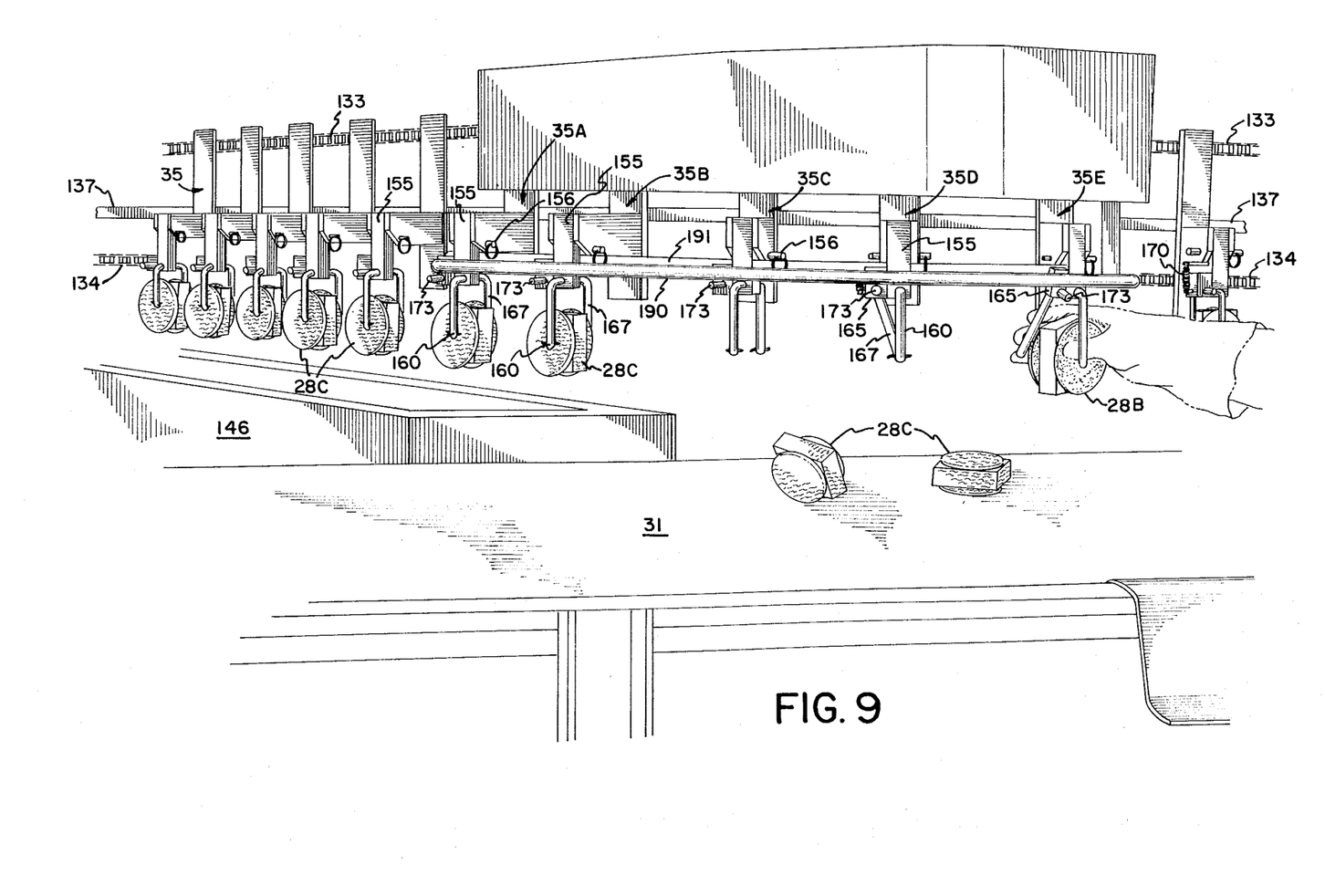
FIG. 9 is a perspective view, partially broken away, showing the chocolate coating machines of the present invention automatically dropping the fully dried, chocolate-coated ice cream cookie sandwiches onto a conveyor system for delivery, as well as showing uncoated ice cream cookie sandwiches being inserted into the clamps of the chocolate coating machine of this invention.

In order to enhance the trouble-free, rotational movement of holding clamps 35 about chocolate coating machine 23 in a continuously repeating cyclical operation, chocolate coating machine 23 incorporates elongated, longitudinally extending supporting tracks 137 mounted along at least the two longer sides of chocolate coating machine 23. As shown in FIGS. 7, 8 and 9, tracks 137 support rollers 140, one of which is rotationally pinned to each holding clamp 35. In this way, chains 133 and 134 are provided with additional support to maintain the plurality of clamps 35 along both the longer sides in the desired operational configuration, without fear of unwanted sagging or drooping.

If desired, tracks 137 could be mounted along the shorter sides of chocolate coating machine 23. However, it has been found that chain drive belts 133 and 134 are capable of supporting the weight of holding clamps 35 along the shorter sides, without drooping or sagging of clamps 35.

As is more fully detailed below, chocolate coating machine 23 automatically moves each ice cream cookie sandwich placed in each holding clamp 35 about the outer periphery of chocolate coating machine 23, while automatically enrobing the ice cream cookie sandwich with a chocolate coating, and then drying the chocolate coating prior to automatically dropping the chocolate-coated ice cream cookie sandwich onto a conveyor belt for transportation to the wrapping station.

As shown in FIG. 1, chocolate coating machine 23 incorporates a chocolate holding tank or vat 143 and three drip-receiving tanks 144, 145 and 146. As is readily apparent from FIG. 1, each and every ice cream cookie sandwich holding clamp 35 first travels through chocolate holding tank 143 and then passes over drip-receiving tanks 144, 145 and 146 before passing over conveyor belt 141, onto which the completely dry chocolate-coated ice cream cookie sandwich is dropped for travel to the wrapping station. Once a clamp 35 has dropped its chocolate-coated ice cream cookie sandwich, the clamp moves to the front of chocolate coating machine 23, ready for the receipt of another ice cream cookie sandwich and a repeat of the travel about chocolate coating machine 23.

Figure 6:
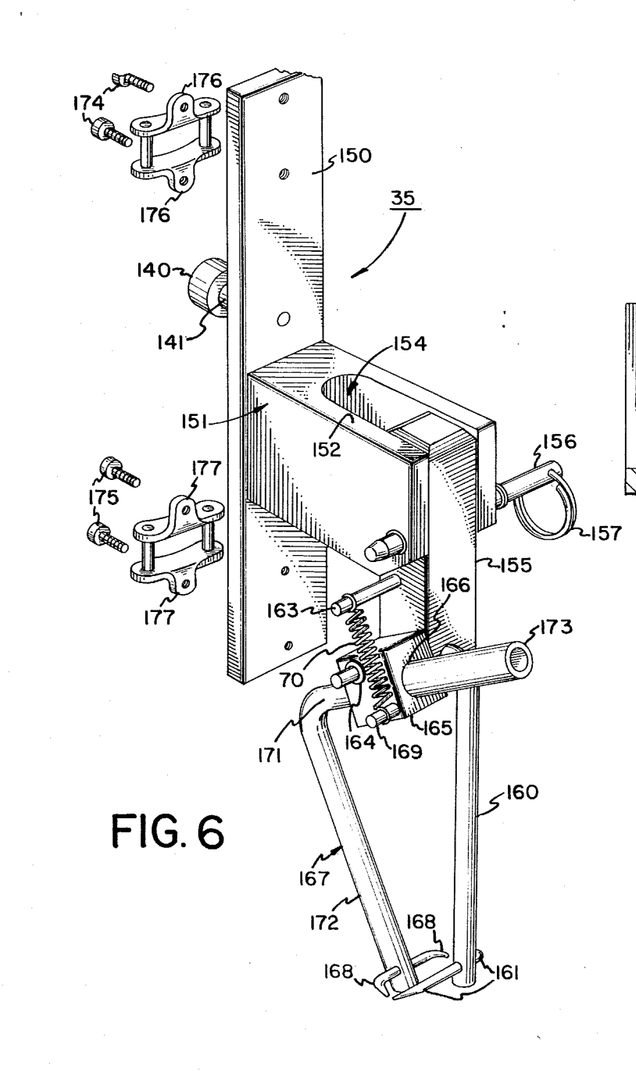
FIG. 6 is a perspective view of the ice cream cookie sandwich clamp mechanism employed in the chocolate coating machines of the present invention.

Before discussing in detail the construction and operation of chocolate coating machine 23, reference should be made to FIG. 6, along with the following detailed discussion of the construction of holding clamp 35. Holding clamp 35 incorporates a substantially vertically disposed plate 150 to which bracket 151 is securely mounted. Preferably, bracket 151 is mounted at its proximal end substantially perpendicularly to plate 150. In addition, the distal end of bracket 151 incorporates two trunnion-like support panels 152 and 153, which are in juxtaposed, spaced, cooperating relationship to each other and form a support zone 154 therebetween.

In the preferred embodiment, an elongated arm-holding post 155 is pivotally mounted between plates 152 and 153 in support zone 154 by means of pivot pin 156. Preferably, pivot pin 156 comprises an elongated, quick-disconnect member incorporating a readily accessible finger loop 157 enhance the quick removability of pin 156. In this way, post 155 is quickly and easily removed for cleaning, as well as remounted in bracket 151. Preferably, arm-supporting post 155 is pivotally mounted to bracket 151 in position which allows pivoting movement of post 155 through an arc of at least ninety degrees.

At the base of post 155, an elongated clamping arm 160 is securely affixed. Preferably, clamping arm 160 is welded to post 155 at the proximal end of arm 160, while incorporating a pair of prongs 161 at its distal end. Prongs 161 assist in securely clamping and holding the ice cream cookie sandwich mounted thereto.

Although the teaching of the present invention can be achieved by employing holding clamp 35 in any one of various configurations, the holding clamp detailed herein has been found to be extremely effective in achieving the objects of the present invention. In this regard, post 155 is preferably constructed with a rectangular cross-section, with the proximal end of clamping arm 160 mounted to the forward facing surface of post 155. In addition, one of the adjacent side surfaces of post 155 incorporates pins 163 and 164 secured thereto and extending substantially perpendicularly therefrom.

Holding clamp 35 also incorporates a clamping arm holding block 165 which is pivotally supportingly mounted to pin 164 of post 155. In addition, clamp 35 incorporates an inverted L-shaped clamping arm 167 which comprises a shorter portion 171 and a longer portion 172. Preferably, block 165 incorporates a through hole 166, in which portion 171 of L-shaped clamping arm 167 is slidingly mounted.

At the base of block 165 is mounted a set screw (not shown) which securely retains portion 171 of L-shaped clamping arm 167 in any desired position along its slidable length. In this way, the effective clamping width between arm 160 and 167 is adjustable to accommodate varying-sized ice cream cookie sandwiches, or other products. When in its desired position in block 165, L-shaped arm 167 incorporates a portion 171A extending forwardly from hole 166 of block 165. Preferably, a tubular cover 173 is mounted about extension portion 171A. As detailed below, cover 173 reduces the frictional contact between portion 171A and camming bars incorporated into chocolate coating machine 23. The distal end of clamp arm 167 incorporates prongs 168 which are positioned in juxtaposed, cooperating relationship with prongs 161 of clamping arm 160.

Support block 165 also incorporates a pin member 169 extending from one of the surfaces thereof, substantially perpendicularly therefrom with pin member 169 having its central axis substantially parallel to central axis of pin 163. In this way, a coil spring 170 is securely mounted to pins 163 and 169 in tension, so that spring 170 constantly urges pin 169 towards pin 163.

As a result, spring 170 attempts to pivot block 165 about pivot pin 164 in a clockwise fashion, bringing prongs 168 of arm 167 into abutting engagement with prongs 161 of arm 160. As a result, clamping arms 160 and 167 are constantly urged into their closed, engaged position, providing assurance that the ice cream cookie sandwich positioned therebetween will be securely held throughout the travel of the ice cream cookie sandwich about chocolate coating machine 23.

In the preferred embodiment, holding clamp 35 also incorporates a shaft 141 mounted to the rear surface of plate 150 with roller bearing 140 mounted at the distal end of shaft 141. In this preferred embodiment, roller 140 freely rotates about shaft 141, assuring the low friction movement of holding clamp 35 along its support tracks 137.

Finally, holding clamp 35 incorporates a first pair of screw members 174 which are threadedly engaged with the upper rear portion of plate 150, and a second pair of screw members 175, which are threadedly engaged with the rear of plate 150 near the bottom thereof. Screw member 174 is constructed for threaded engagement with flanges formed along chain drive belt 133, while screw means 175 are threadedly engaged with flanges 177 formed along chain drive belt 134. In this way, when holding clamp 35 is securely mounted to chocolate coating machine 23, the secure, interconnected, engagement of holding clamp with chocolate coating machine 23 is assured and its repeated, cyclical, trouble-free rotational movement about machine 23 is enhanced.

In FIG. 7, the front of chocolate coating machine 23 is shown. Although FIG. 7 depicts chocolate coating machine 23 during its installation process, the front portion thereof which is depicted in FIG. 7 would be mounted in cooperating relationship with conveyor belts 30 and 31, as depicted in FIG. 1.

In operation, as ice cream cookie sandwich holding clamps 35 are driven about chocolate coating machine 23, by means of chain drive belts 133 and 134, an uncoated ice cream cookie sandwich is inserted between arms 160 and 167 of each clamp 35, and securely clamped therebetween. Then, once holding clamps 35 move in the direction shown by the arrows in FIG. 7, each clamp advances into contact with clamp camming bar 180.

Clamp camming bar 180 is securely mounted to chocolate coating machine 23, and is positioned between pivotally supported post 155 and anchor plate 150 of each clamp 35. In addition, as each clamp 35 slidingly advances along camming bar 180, bar 180 causes post 155 to pivot about pivot pin 156 until post 155 is pivoted through an arc of about ninety degrees, causing the ice cream cookie sandwich held between arms 160 and 167 of each clamp 35 to be moved into a substantially horizontal position.

By referring to FIG. 8, the progression of holding clamps 35 as the clamps advance along camming bar 180 through chocolate holding tank 143 can best be understood. Initially, each non-coated ice cream cookie sandwich 28B is suspended substantially horizontally by clamping arms 160 and 167 of holding clamps 35. Arms 160 and 167 are maintained in a substantially horizontal position since post 155 overlies camming bar 180 in supported sliding and horizontal contact therewith. This position is represented in FIG. 8 by clamp 35A.

In order to achieve the desired fully covered chocolate coating, clamp camming bar 180 gently slopes downwardly, allowing post 155 of clamp 35 to controllably move downwardly therewith, as clamp 35 further advances along its route of travel. This position is designated in FIG. 8 as clamp 35B.

Then, in order to achieve the desired complete coating, camming bar 180 angles rearwardly at section 181, continues in the rearward position for a short distance, and then gently angles forwardly along section 182, until reaching its original, forwardly disposed position. In operation, as each post 155 moves along camming bar 180 in controlled sliding engagement therewith, post 155 pivots downwardly about its axis 156 as the clamp advances along section 181 to the rearwardmost section of bar 180. This position is shown in FIG. 8 as clamp 35C, with post 155 pivoted substantially ninety degrees to a substantially vertical position. In this position, the ice cream cookie sandwich mounted to clamp 35C is fully submerged in the chocolate bath 179 of holding tank 143.

Then, as clamp moves further along camming bar 180 with post 155 in sliding controlled engagement therewith, post 155 of clamp 35 pivots upwardly about pin 156, causing the chocolate-coated ice cream cookie sandwich 28C to return to a substantially horizontal position, as depicted by clamp 35D in FIG. 8.

In the preferred operation, each clamp 35 is maintained in the substantially horizontal position with the fully chocolate-coated ice cream cookie sandwich held substantially horizontally between arms 160 and 167 thereof, until the chocolate-coated ice cream cookie sandwich has cleared holding tank 143. Then, camming bar 180 controllably allows the pivot post 155 of each clamp 35 to pivot downwardly, returning to its normal, substantially vertical position, while moving out of contact with bar 180.

Once clamps 35 are returned to their original vertical position with post 155 substantially vertical, clamps 35 progressively advance about chocolate coating machine 23, with the chocolate coating peripherally surrounding each ice cream cookie sandwich slowly cooling and drying. During this movement, all of the excess chocolate contained on the ice cream cookie sandwich drips into drip-receiving pans 144, 145 and 146, depicted in FIG. 1.

In the preferred embodiment, chocolate bath holding tank 143 comprises a double-walled tank in which heated water is continuously circulated. In this way, the chocolate bath 179 is maintained at an elevated temperature, preventing solidification of the chocolate, while also assuring its even coatability about the ice cream cookie sandwiches immersed therein.

In order to assure that each and every ice cream cookie sandwich is fully covered with the chocolate coating, the level of the chocolate in bath 179 must be maintained. In order to provide this constant level, a signalling float system 185 is mounted to tank 143 and is immersed in chocolate bath 179. By incorporating float system 185, a pre-set level decrease is allowed, until float 185 has descended to the signalling position, at which time additional chocolate is fed into tank 143.

In the preferred embodiment, holding tank 143 is filled with additional chocolate through tube means 186. Preferably, the chocolate being supplied is maintained at a constant elevated temperature and is fed into holding tanks 143 of each of the chocolate coating machines 23 in the production system by a common flow system.

Once the ice cream cookie sandwiches have been fully covered with the desired chocolate coating and the chocolate-coated ice cream cookie sandwiches have advanced past tank 143, each pivot post 155 is gradually disengaged from controlled camming contact with cam bar 180 and allowed to descend to its normally vertical position. In this position, each chocolate-coated ice cream cookie sandwich is securely clamped between arms 160 and 167 of a clamp 35 and advances about chocolate coating machine 23, with the chocolate coating having sufficient time to shed all excess chocolate into one of the drip-receiving tanks, while cooling and drying to the desired consistency.

Once the chocolate-coated ice cream cookie sandwiches have travelled about chocolate coating machine 23 and have completed travel over drip-receiving tank 146, each clamp 35 is brought into engagement between elongated, cooperating clamp controlling rods or bars 190 and 191. By referring to FIG. 9, along with the following detailed disclosure, the operation of clamps 35 with control bars 190 and 191 can best be understood.

As holding clamps 35 approach clamp controlling bars 190 and 191, the chocolate coating on each ice cream cookie sandwich 28C has fully cooled and dried, and is ready for wrapping. As chain drive belts 133 and 134 controllably advance each holding clamp 35 towards elongated clamp controlling bars 190 and 191, each holding clamp 35 is brought into cooperating, controlled engagement between elongated bars 190 and 191.

As shown in FIG. 9, the initial position, represented by clamp 35A, elongated bar 191 abuts the rear surface of post 155, preventing post 155 from pivoting rearwardly about the axis defined by pin 156. In addition, lever 173 of clamping arm 167 is brought into juxtaposed, spaced, facing relationship with elongated control bar 190. As clamp 35 advances to the position represented by clamp 35B, lever 173 comes into sliding contact with elongated control rod 190.

As clamp 35 continues, towards the position represented by clamp 35C, rod 190 forces lever 173 to move downwardly, pivoting holding block 165 about its pivot axis, and causing arm 167 to pivot therewith, moving away from arm 160. As the clamp continues to advance along controlled contacting engagement with elongated control rods 190 and 191, lever 173 is progressively moved downwardly, causing arm 167 to be progressively moved away from arm 160, until arms 160 and 167 are separated a sufficient distance to allow the chocolate-coated ice cream cookie sandwich 28C to drop therefrom. Then, as shown by clamps 35C and 35D chocolate-coated ice cream cookie sandwich 28C is released above conveyor belt 31, thereby allowing the chocolate-coated ice cream cookie sandwich to be dropped onto conveyor belt 31 and delivered to the wrapping area.

The clamps continue to advance in controlled engagement with elongated control bars 190 and 191 with the arms of the clamps remaining in the open position. This allows the operator to place a non-coated ice cream cookie sandwich 28B between arms 160 and 167 of clamp 35E, as clamp 35E exits from controlled engaged with elongated rods 190 and 191. Then, coil spring 170 forces arms 167 and 160 into clamping engagement, securely maintaining ice cream cookie sandwich 28B therebetween for movement through the chocolate coating process.

As is readily apparent from the preceding description, chocolate coating machine 23 of the present invention is capable of efficiently and automatically coating ice cream cookie sandwiches, or any other product mounted in holding clamps 35 with the particular coating material contained in tank 143. In addition, coating machine 23 automatically removes the ice cream cookie sandwich from the tank 143 and allows the coating to cool and dry, prior to automatically opening clamps 35 to release the coated ice cream cookie sandwich onto a conveyor belt which bring the chocolate-coated ice cream cookie sandwich to the wrapping area. As a result, chocolate coating machine 23 attains the desired automatic operation efficiently, with a minimum of labor.

Another feature incorporated into the present invention is the collection of the excess chocolate coating in a manner which allows the excess to be reused. This is achieved by incorporating a heating source in the drip-collecting tanks 144, 145 and 146 to maintain the collected chocolate in a liquid state, and transferring the chocolate to a central holding tank.

As shown in FIG. 7, drip collecting tanks 144 and 146 incorporate heating lamps 195 mounted in the base of the drip collecting tanks. Preferably, heating lamps 195 are mounted on a vertical slide support 196 to allow easy access to the lamps for removal and replacement whenever necessary. In this way, holding tanks 144 and 146, as well as 145 (not shown) maintain the chocolate drip collection at an elevated temperature, preventing the solidification of the chocolate and allowing the chocolate to drip into a central collection tank for subsequent transportation to a holding tank for recycling. As a result, this system of the present invention further achieves efficiency and conservation of the coating being applied.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting means.

It is also to be understood that the following claims are intended to cover all of the generic and specific features of the invention herein described, and all statements of the scope of the invention which, as a matter of language, might be said to fall therebetween.

Having described by invention, what I claim as new and desire to secure by Letters Patent is:

1. An ice cream brick slicing machine comprising
  A. an ice cream brick receiving chute constructed for receiving and passing a brick of ice cream therethrough,
  B. an ice cream section transfer tunnel communicating with the brick receiving chute in position for receipt of a portion of the ice cream contained within said chute, and comprising
    a. a cutting blade cooperatingly associated with the chute and the tunnel for cutting ice cream sections from the ice cream brick and depositing the sections in the tunnel; and
    b. ice cream section transfer means for controllably advancing the ice cream sections through the tunnel;
  C. an ice cream slice transfer passageway, communicating with the ice cream section transfer tunnel, adapted for receiving a portion of the ice cream contained within said tunnel, and comprising
    a. a second cutting blade cooperatingly associated with the ice cream slice transfer passageway and the ice cream section transfer tunnel for cutting an ice cream slice off of the ice cream section and depositing the ice cream slice in the ice cream slice transfer passageway, and
    b. ice cream slice pusher means for pushing the slice of ice cream out of the ice cream slice transfer passageway, whereby an efficient ice cream brick slicing machine is attained capable of receiving a full ice cream brick and quickly, easily and efficiently slicing the brick of ice cream into a plurality of slices.

2. The ice cream brick slicing machine defined in claim 1, further comprising
  D. ice cream slice delivery means for contacting the ice cream slice as it emerges from the ice cream slice transfer passageway and forwardly advancing the ice cream slice to a holding zone for removal therefrom.

3. The ice cream brick slicing machine defined in claim 1, wherein the bricks of ice cream positioned in the brick receiving chute comprises a rectangular cross-section.

4. The ice cream brick slicing machine defined in claim 1, wherein all of the ice cream receiving components are constructed for quick disassembly from the slicing machine, thereby assuring easy and thorough cleanup of all necessary components.

5. The ice cream brick slicing machine defined in claim 1, wherein both the first and second cutting blades are further defined as comprising
  1. a substantially C-shaped casting,
  2. a substantially rectangular ice cream slicing blade affixed to one surface of the C-shaped casting and covering substantially the entire surface thereof.
  3. a plurality of screws threadedly engaged with the casting for securely retaining the cutting blade to the casting, and
  4. block members mounted on the opposed surface of the C-shaped casting with said block members incorporating shaft receiving holes for securely mounting of the assembly to support shafts.

6. The ice cream brick slicing machine defined in claim 1, wherein said ice cream transfer means is further comprising:
1. an air cylinder securely mounted in the ice cream section transfer tunnel,
2. a piston shaft cooperatively associated with the air cylinder for movement along its axis in response to the activation of the air cylinder, and
3. an ice cream section pusher mounted to the distal end of the piston rod for directly contacting and advancing the ice cream section longitudinally through said tunnel in response to the movement of said piston rod.

7. The ice cream brick slicing machine defined in claim 6, wherein said ice cream section pusher is further defined as comprising a multi-layered structure incorporating at least two outer layers formed of teflon and at least one central layer formed of metal, with all of said layers both glued and screwed together, thereby assuring ease of operation as well as cleanliness and longevity.

8. The ice cream brick slicing machine defined in claim 1, wherein the ice cream section transfer tunnel is defined as comprising a unitary, elongated, substantially U-shaped channel member positionable on a support table, and cooperatingly associated with cover means in order to enclose the ice cream section transfer operation, while also allowing easy removal from the table for cleaning.

9. The ice cream brick slicing machine defined in claim 8, wherein said ice cream section transfer tunnel further comprises a bar member pivotably mounted between two of the side surfaces of the tunnel and positioned for allowing the movement of the ice cream sections in one longitudinal direction, while preventing the movement of the ice cream section in the opposite longitudinal direction.

10. The ice cream brick slicing machine defined in claim 1, and further comprising
D. a heater assembly comprising
   a. an air blower,
   b. conduit means extending from the blower to the second ice cream slice cutting blade,
   c. heater means mounted in the conduit for elevating the temperature of the air passing through the conduit, and
   d. nozzle means mounted in the conduit for elevating the temperature of the air passing through the conduit, and
   e. nozzle means mounted at the terminating end of the conduit means in juxtaposed spaced relationship to the second, ice cream slice cutting blade, thereby preventing unwanted icing of the brick during use.

11. The ice cream brick slicing machine defined in claim 1, further comprising
D. cutting blade drive means controllably connected at least one of said cutting blade and constructed for cyclically moving the cutting blade between a first, ice cream cutting position and a second, disengaged position, said drive means comprising
   a. an air cylinder mounted at one end to a support member,
   b. a piston rod controllably associated with the air cylinder for movement between a first fully drawn position and a second, fully extended position,
   c. a bracket member mounted to the distal end of the piston rod for controlled movement therewith,
   d. two elongated shafts, supportingly mounted along their length for sliding engagement, and securely affixed at one end to the bracket member and affixed at their opposed ends to the cutting blade,
whereby activation of the air cylinder causes the piston rod to move from its first, fully withdrawn position to its second, fully extended position which simultaneously causes the bracket to move therewith, along with the elongated shafts which thereby causes the cutting blade to move from a first, disengaged position to a second, ice cream slicing engaged position.

12. The ice cream brick slicing machine defined in claim 11, further comprising two independent drive means, one of which is associated with each of said ice cream cutting blades, thereby controllably moving both of the cutting blades between two alternate positions, with precision and ease in a repeated, cyclical fashion, automatically, without requiring operating personnel.

13. The ice cream brick slicing machine defined in claim 1, wherein the ice cream slice pusher means is further defined as comprising
1. an air cylinder securely mounted to a support base and incorporating a piston rod responsive to the air pressure to the cylinder for movement either forwardly or rearwardly wherein
2. a piston bar, removably attached to the end of the piston rod for controlled movement in response to the movement of the piston rod,
3. an ice cream slice pushing block, mounted within the ice cream slice transfer, in sliding, cooperative engagement therewith and incorporating a piston bar attachment anchor means mounted at one end thereof with a quick removable disconnect assembly,
whereby the piston block moves longitudinally through the ice cream slice transfer, in response to the movement of the air cylinder while also incorporating a quick disconnect assembly for removal of the block and the piston bar for cleaning whenever necessary.

14. The ice cream brick slicing machine defined in claim 2, wherein said delivery means is further defined as comprising
a. an air cylinder
b. a piston rod cooperatively associated with the air cylinder for movement along its longitudinal length in response to the activation of the air cylinder between a first, fully withdrawn position and the second, fully extended position, and
c. an ice cream slice delivery disc mounted to the distal end of the piston rod for contacting the ice cream slice emerging from the ice cream transfer tunnel and moving the ice cream slice forwardly, to the desired slice holding zone.

15. The ice cream brick slicing machine defined in claim 1, wherein ice cream section transfer means, the ice cream slice pusher means, and the ice cream slice delivery means are all cooperatively associated for timed, interrelated operation.

16. The ice cream brick slicing machine defined in claim 15, wherein a plurality of solid state electronic switches are mounted in cooperating association with all of the drive means and pusher means for controlled, timing interrelated operation of the ice cream slicing machine.

* * * * *